United States Patent
Wing et al.

(10) Patent No.: US 9,253,237 B2
(45) Date of Patent: Feb. 2, 2016

(54) RICH MEDIA STATUS AND FEEDBACK FOR DEVICES AND INFRASTRUCTURE COMPONENTS USING IN PATH SIGNALING

(71) Applicant: Cisco Technology, Inc., San Jose, CA (US)

(72) Inventors: Daniel G. Wing, San Jose, CA (US); Pål-Erik S. Martinsen, Ås (NO); Herbert M. Wildfeuer, Santa Barbara, CA (US); Jan Wegger, Kolsas (NO); Geir Sandbakken, Oslo (NO); Greg Hakonsen, Sokna (NO)

(73) Assignee: Cisco Technology, Inc., San Jose, CA (US)

( * ) Notice: Subject to any disclaimer, the term of this patent is extended or adjusted under 35 U.S.C. 154(b) by 235 days.

(21) Appl. No.: 13/736,161

(22) Filed: Jan. 8, 2013

(65) Prior Publication Data

US 2014/0006639 A1    Jan. 2, 2014

Related U.S. Application Data

(60) Provisional application No. 61/666,057, filed on Jun. 29, 2012, provisional application No. 61/666,059, filed on Jun. 29, 2012.

(51) Int. Cl.
*H04L 29/06* (2006.01)
*H04L 29/12* (2006.01)
*G06F 15/173* (2006.01)
*H04L 12/741* (2013.01)

(52) U.S. Cl.
CPC ............. *H04L 65/601* (2013.01); *H04L 45/74* (2013.01); *H04L 61/2575* (2013.01); *H04L 65/4092* (2013.01); *H04L 65/605* (2013.01); *H04L 65/80* (2013.01); *H04L 61/2514* (2013.01)

(58) Field of Classification Search
CPC ..................... H04L 29/06027; H04L 61/2575; H04L 65/601
USPC ........... 709/227, 242, 223–224; 370/352, 392
See application file for complete search history.

(56) References Cited

U.S. PATENT DOCUMENTS

| | | | | |
|---|---|---|---|---|
| 5,638,365 | A * | 6/1997 | Duault et al. | 370/236.1 |
| 7,647,614 | B2 * | 1/2010 | Krikorian et al. | 725/94 |
| 7,688,788 | B2 * | 3/2010 | Gefflaut | H04W 28/08 370/235 |
| 7,822,046 | B2 | 10/2010 | Wing et al. | |

(Continued)

FOREIGN PATENT DOCUMENTS

WO    2008045580 A1    4/2008

OTHER PUBLICATIONS

International Search Report and Written Opinion in counterpart International Application No. PCT/US2013/044640, mailed Sep. 10, 2013, 8 pages.

*Primary Examiner* — David Lazaro
*Assistant Examiner* — Zi Ye
(74) *Attorney, Agent, or Firm* — Edell, Shapiro & Finnan, LLC

(57) ABSTRACT

A STUN message is received at a router device in a network from a client device in the network along a network path. The STUN message is evaluated for information that indicates to the router device to modify media that is subsequently sent along the network path. If the evaluating indicates that the router device is to modify the media, the media is modified in accordance with information in the STUN message that indicates attributes of the network.

14 Claims, 11 Drawing Sheets

(56) References Cited

U.S. PATENT DOCUMENTS

| | | | |
|---|---|---|---|
| 7,933,273 B2* | 4/2011 | Takeda | H04L 61/2575 370/352 |
| 2005/0025051 A1* | 2/2005 | Roeder | 370/230 |
| 2008/0091811 A1* | 4/2008 | Wing | H04L 12/5695 709/223 |
| 2010/0125768 A1 | 5/2010 | Mauchly et al. | |
| 2012/0120270 A1 | 5/2012 | Li et al. | |
| 2012/0127259 A1 | 5/2012 | Mackie et al. | |

* cited by examiner

FIG.4

LIGHTWEIGHT. SHOULD USE LITTLE RESOURCES ON ROUTERS AND ENDPOINTS
NEW STUN METHOD
   0x00B : AGGREGATEDPATHSTATUS
NEW STUN ATTRIBUTES
   0x0024: CPU-LOAD  ⎫
   0x0025 QUEUE FILL GRADE  ⎬ 402
   0x0026 MIN MTU? (STATIC)  ⎭
WILL GIVE DETAILED INFORMATION REGARDING WHICH NODE HAS THE AGGREGATED "WORST" RESULT

400

CPU LOAD ATTRIBUTE

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0 0 0 0 0 0 0 1|    Family     |            Port               |
+-+-+-+-+-+-+-+-+-+-+-+-+-+-+-+-+-+-+-+-+-+-+-+-+-+-+-+-+-+-+-+-+
|             Address (XOR)  (32 bits or 128 bits)              |
+-+-+-+-+-+-+-+-+-+-+-+-+-+-+-+-+-+-+-+-+-+-+-+-+-+-+-+-+-+-+-+-+
|   CPU-Load    |      DIR      |           Padding             |
+-+-+-+-+-+-+-+-+-+-+-+-+-+-+-+-+-+-+-+-+-+-+-+-+-+-+-+-+-+-+-+-+
```

RICH MEDIA STATUS AND FEEDBACK FOR DEVICES AND INFRASTRUCTURE COMPONENTS USING IN PATH SIGNALING

RELATED APPLICATIONS

This application claims the benefit of U.S. Provisional Application Ser. No. 61/666,057 filed on Jun. 29, 2012 and the benefit of U.S. Provisional Application Ser. No. 61/666,059 filed on Jun. 29, 2012, which are both incorporated herein by reference in their entireties.

TECHNICAL FIELD

The present disclosure relates to obtaining network information.

BACKGROUND

Network devices that reside in private networks may communicate with one another along data paths in a network. For example, a network device that resides in one private network may engage in Voice over Internet Protocol (VoIP) communications with a network device that resides in another private network. Often times, the network devices in a private network may have address information that is inaccessible by devices residing outside of the private network. As a result, communications between devices in different private networks may be lost or misrouted. To avoid these communication problems, the network devices in a private network may utilize a Session Traversal Utilities for Network Address Translators (STUN) protocol (e.g., as described by the Internet Engineering Task Force (IETF) Request For Comments (RFC) 5389) to obtain public address information that is accessible by devices outside of the private network. Additionally, to check connectivity between network devices, STUN messages may be sent (e.g., in accordance with an Interactive Connectivity Establishment (ICE) protocol, as described by the IETF RFC 5245) along a network path between network devices before they engage in, for example, VoIP communications. Often times, these connectivity messages traverse or travel across the same network path that is used for VoIP and other rich media communications between the network devices.

BRIEF DESCRIPTION OF THE DRAWINGS

FIG. 4 shows an example of the modified STUN request message with information associated with attributes of the routers in the data path.

DESCRIPTION OF EXAMPLE EMBODIMENTS

Overview

Techniques are provided herein for obtaining network quality information between endpoint devices by modifying connectivity messages sent between the endpoint devices along a data path. The techniques may be embodied as a method, an apparatus or a computer readable media that is operable to perform the method. A router device in a network obtains a Session Traversal Utilities for Network Address Translators (STUN) request message from a source client device that is destined for a destination client device along a network path. The STUN request message is modified with information that indicates attributes of the network. The STUN request message is then sent toward a network device in the network path.

Additionally, a source client device sends a STUN request message to a destination client device along the network path, and the source client device receives a STUN response message from the destination client device that has traversed the network path. The STUN response message is evaluated to determine whether there is an indication in the STUN response message for the source client device to modify media that is to be sent to the destination client device along the media path. If the evaluating determines that the source client device is to modify the media, the media is modified in accordance with the information in the STUN response message.

Furthermore, a STUN message is received at a router device in a network from a client device in the network along a network path. The STUN message is evaluated for information that indicates to the router device to modify media that is subsequently sent along the network path. If the evaluating indicates that the router device is to modify the media, subsequently received media is modified in accordance with information in the STUN message that indicates attributes of the network.

Example Embodiments

Figure 1:
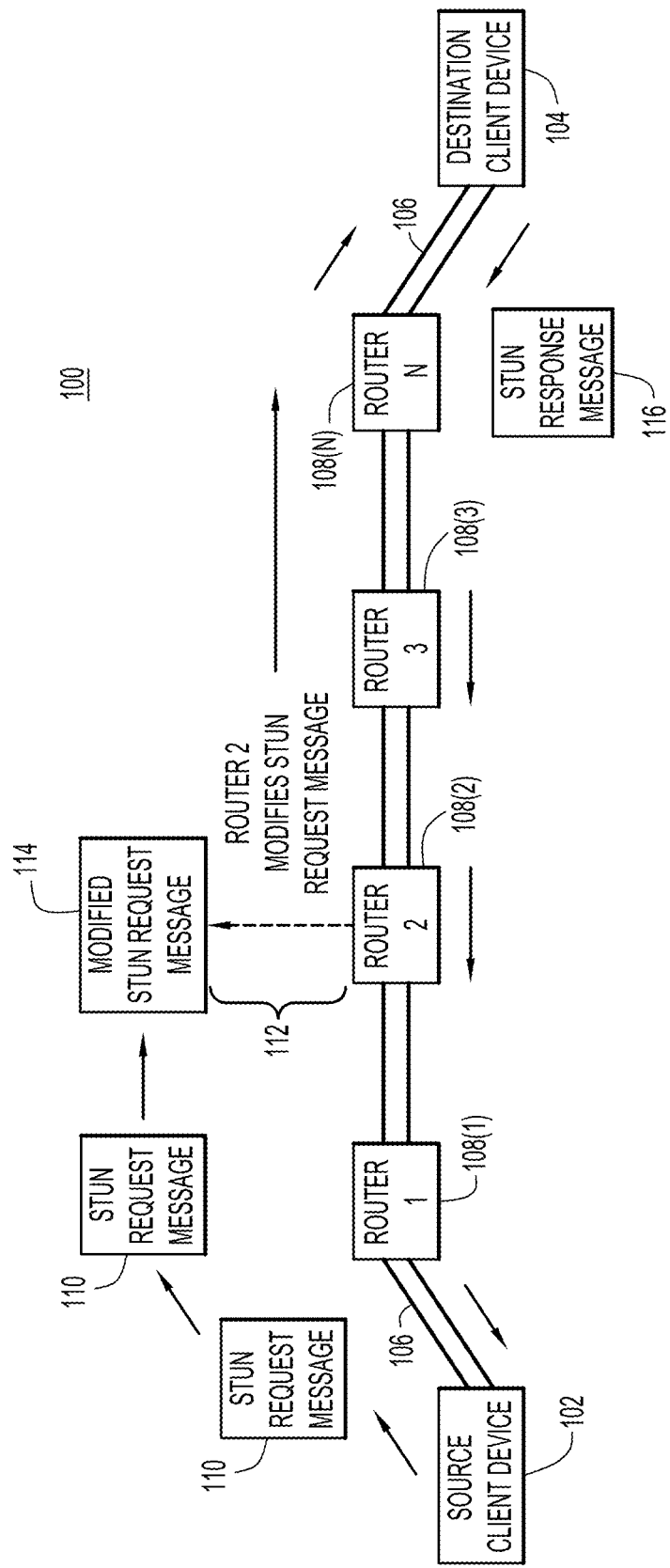
FIG. 1 shows an example network topology that shows a source client device sending a Session Traversal Utilities for Network Address Translators (STUN) request message that is destined for a destination client device along a data path and routers in the data path that are configured to modify the STUN request message.

The techniques described hereinafter relate to obtaining network quality information between endpoint devices by modifying connectivity messages that are exchanged between the endpoint devices. An example network/system topology (hereinafter "network") is shown in FIG. 1 at reference numeral 100. The network 100 comprises a source client device, shown at reference numeral 102, and a destination client device, shown at reference numeral 104. The source client device 102 and the destination client device 104 may be any network device (e.g., a computer, laptop, tablet, mobile device, etc.) that are configured to exchange data with each other across a data path (e.g., a network path) 106. For example, the source client device 102 and the destination client device 104 may exchange digital interactive media (e.g., "rich media") such as Voice over Internet Protocol (VoIP) communications with each other across the data path 106. The source client device 102 and the destination client device 104 also exchange connectivity messages with one another, as described by the techniques hereinafter.

The network 100 also comprises a plurality of routers device (hereinafter "routers") 108(1)-108(n). The routers 108 (1)-108(n) may be any network router or network switch device that is configured to receive data packets and to forward data packets to appropriate destination devices in the network. For simplicity, the routers 108(1)-108(n) are shown as network routers, though it should be appreciated that any or all of the routers may also be network switch devices. Additionally, for ease of explanation it is noted that, e.g., router 108(1) may be referred to hereinafter as "Router 1," router 108(2) may be referred to hereinafter as "Router 2," and so on.

Although not shown in FIG. 1, the source client device 102 and the destination client device 104 may be located in corresponding private networks. These private networks may have one or more Network Address Translator (NAT) devices and/or other firewall network devices ("firewalls"). The NAT devices and/or firewalls are not shown in FIG. 1. When the source client device 102 resides in a private network, the source client device 102 may be assigned private address identifier information (e.g., a private Internet Protocol (IP) address and/or a private Media Access Control (MAC) address) that is inaccessible by the destination client device 104 and other network devices outside the private network. Likewise, when the destination client device 104 resides in a private network, the destination client device 104 may also be assigned a private IP address and/or a private MAC address that is inaccessible by the source client device 102 and other network devices outside the private network. For example, the private addresses of the source client device 102 and the destination client device 104 may be known only to their corresponding NAT devices, and thus, the source client device 102 and the destination client device 104 may be said to reside "behind" these NAT devices.

In this example, since the private IP address of the source client device 102 is inaccessible to the destination client device 104 (and vice versa), both the source client device 102 and the destination client device 104 may obtain a public address identifier information that is accessible to each other. One mechanism for obtaining this public address identifier information is by using a Session Traversal Utilities for NAT (STUN) protocol. The STUN protocol is described in the Internet Engineering Task Force (IETF) Request for Comments (RFC) 5389. In short, the STUN protocol enables the source client device 102 and the destination client device 104 to "traverse" the NAT devices in their respective private networks in order to obtain public address identifier information (e.g., that maps the private IP address to the public IP address of the NAT devices) that can be used by network devices to send and receive communications to the source client device 102 and the destination client device 104.

In other words, when the source client device 102 and the destination client device 104 use messages in accordance with the STUN protocol (also referred to hereinafter as "STUN messages") to obtain public address identifier information, the source client device 102 and the destination client device 104 are able to send communications to each other using the public address identifier information via the data path 106. These communications may include network connectivity messages that may be sent between the source client device 102 and the destination client device 104 to ensure that there is end-to-end connectivity between these devices. These communications may also include other data communications such as the VoIP communications or other rich media communications described above. It should be appreciated that the STUN protocol is merely an example protocol that the source client device 102 and the destination client device 104 can use to obtain traverse their respective NAT devices to obtain public address identifier information.

After the source client device 102 and the destination client device 104 obtain their public address identifier information, the network connectivity messages may be sent along the data path 106 to ensure the end-to-end connectivity between the source client device 102 and the destination client device 104. These connectivity messages are sent, for example, to prevent any potential communication disruptions in the event that end-to-end connectivity is not present between the source client device 102 and the destination client device 104. For example, if the connectivity messages indicate that there is no end-to-end connectivity, the source client device 102 may determine not to send the rich media to the destination client device 104, since, in essence, it "knows" that the rich media will not reach the intended destination. These connectivity messages are typically sent before VoIP communications or other rich media communications are exchanged between the source client device 102 and the destination client device 104. For example, the source client device 102 and the destination client device 104 may exchange STUN messages in accordance with the Interactive Connectivity Establishment (ICE) protocol described by the IETF RFC 5245. The connectivity messages are sent along the same data path that is used for subsequent VoIP/rich media communications (e.g., data path 106). This is known as in-path signaling since the connectivity messages and the rich media traverse the same data path. Thus, in addition to using STUN messages to traverse their respective NAT devices, the source client device 102 and the destination client device 104 can use STUN messages in accordance with the ICE protocol to check end-to-end connectivity between the source client device 102 and the destination client device 104 along the network path 106.

As stated above, protocols other than STUN may be used for these devices to traverse their respective NAT devices to obtain public address identifier information. Regardless of how the source client device 102 and the destination client device 104 traverse their respective NAT devices or firewalls to obtain the public address identifier information (i.e., via STUN messages or otherwise), the source client device 102 and the destination client device 104 can check end-to-end connectivity by sending STUN messages in accordance with the ICE protocol. These STUN messages may be sent before the initiation of VoIP or other rich media communications to ensure initial end-to-end connectivity and may also be sent periodically during the communications to ensure ongoing or continuous end-to-end connectivity.

The frequency at which the STUN messages are sent during the communications depends, for example, on the data rate of the media. High bit rate content (such as high definition (HD) content) will result in frequent STUN messages to be sent to check end-to-end connectivity, while low bit rate content will result in less frequent STUN messages to be send to check connectivity. Thus, STUN messages may be exchanged between the source client device 102 and the destination client device 104 for two reasons: (1) to enable the devices to traverse their respective NAT devices and (2) to check end-to-end connectivity between the devices.

The connectivity evaluation techniques described hereinafter presuppose the devices have already traversed their respective NAT devices (via STUN or another protocol), and these connectivity evaluation techniques involve modifications made to STUN messages that are exchanged for the end-to-end connectivity determinations.

For example, as shown at reference numeral 110 in FIG. 1, a STUN request message may be sent from the source client device 102 destined for the destination client device 104 along the data path 106. As the STUN request message 110 travels along the network path 106, the routers 108(1)-108(n) receive the STUN request message 110 and forward the STUN request message 110 to the appropriate next device in the network path 106. For example, as Router 1 receives the STUN request message 110, it forwards the STUN request message 110 to Router 2, and so on along the network path 106.

Also, as shown in FIG. 1 and described by the connectivity evaluation techniques hereinafter, one or more of the routers 108(1)-108(n) may be configured to modify the STUN message 110 itself. For example, reference numeral 112 shows Router 2 modifying the STUN message 110, which results in the modified STUN request message 114. As described hereinafter, the modified STUN request message 114 may contain information that is added to the STUN request message 110 by Router 2 that describes or reveals network characteristics of the data path 106 at the particular router. That is, when Router 2 modifies the STUN request message 110, it adds or inserts information in the STUN request message 110 that indicates information associated with Router 2. For example, this information may comprise node information, router registration information, network bandwidth information, processing capabilities of the router, state information of the router (including probability of packet loss) etc. It should be appreciated that any router in the network path 106 may modify the STUN request message 110, which results in the modified STUN request message 114, and for simplicity, only Router 2 is shown in FIG. 1 as performing the modification.

Once the modified STUN request message 114 (or STUN request message 110 if no router modifies it) reaches the destination client device 104, the destination client device 104 copies the received STUN message and generates a STUN response message, shown at reference numeral 116 in FIG. 1. The STUN response message 116 contains all of the information in the received STUN message (e.g., the modified STUN request message 114), including any information added by any of the routers 108(1)-108(n). The STUN response message 116 is sent from the destination client 104 to the source client device 102 via the routers 108(1)-108(n) along the network path 106. For example, Router N receives the STUN response message 116 from the destination client device 104 and forwards the STUN response message 116 to Router 3, and so on, until the STUN response message 116 reaches the source client device 102. It should be appreciated that in one example, the STUN response message 116 may reach the source client device 102 along the data path 106 and in another example, the STUN response message 116 may reach the source client device 102 along another data path.

Some or all of the routers 108(1)-108(n) may be configured to read and evaluate the STUN request message 110, modified STUN request message 114 and the STUN response message 116. These routers are referred to hereinafter as "STUN enabled routers." The STUN enabled routers are configured to obtain information in the STUN request message 110, as well as information added to the STUN request message 110 by other routers. For example, in FIG. 1, if Router 2 adds information to the STUN request message 110 and if Router N is a STUN enabled router, Router N may be able to examine the information added by Router 2 and may take appropriate network actions based on this information (e.g., by modifying subsequent communications), as described hereinafter. Likewise, Router N may also add information to the STUN request message 110 (or the modified STUN request message 114), and when Router 2 receives the STUN response message 116, Router 2 may be able to examine the information added by Router N and may also take appropriate network actions based on this information. In other words, STUN enabled routers may effectively communicate with each other using the STUN messages and may obtain information from the STUN messages in order to adjust or modify subsequent rich media communications. These adjustments or modifications to the rich media communications may anticipate downpath network congestion issues in the data path 106 (e.g., when Router 2 adjusts the communications in anticipation of network congestion at Router N) or may compensate for network congestion issues at the point of congestion (e.g., when Router 2 adjusts the communications due to its own reduced processing capabilities).

In one example, some of the routers 108(1)-108(n) may be configured to evaluate the STUN messages, while other routers may not be able to do so. It should also be appreciated that the routers 108(1)-108(n) may optionally modify the STUN response message 116 before it reaches the source client device 102 along the data path 106. When the source client device 102 receives the STUN response message 116, the source client device 102 can determine whether end-to-end connectivity is present with the destination client device 104. The source client device can also evaluate the information in the STUN response message 116 to obtain information that can ultimately help the source client device determine whether or not to modify the subsequent rich media communications (e.g., taking into account information in the STUN messages and other information available to the source client device). For example, the source client device may have other "big picture" information available to it, and the information in the STUN messages may add to this information to allow the source client device to ultimately determine whether or not it should modify the subsequent communications. Similarly, the STUN enabled routers can utilize the information obtained from the STUN request message 110, modified STUN request message 114 and/or the STUN response message 116 also to modify the subsequent rich media communications. These techniques are described hereinafter.

Figure 2:
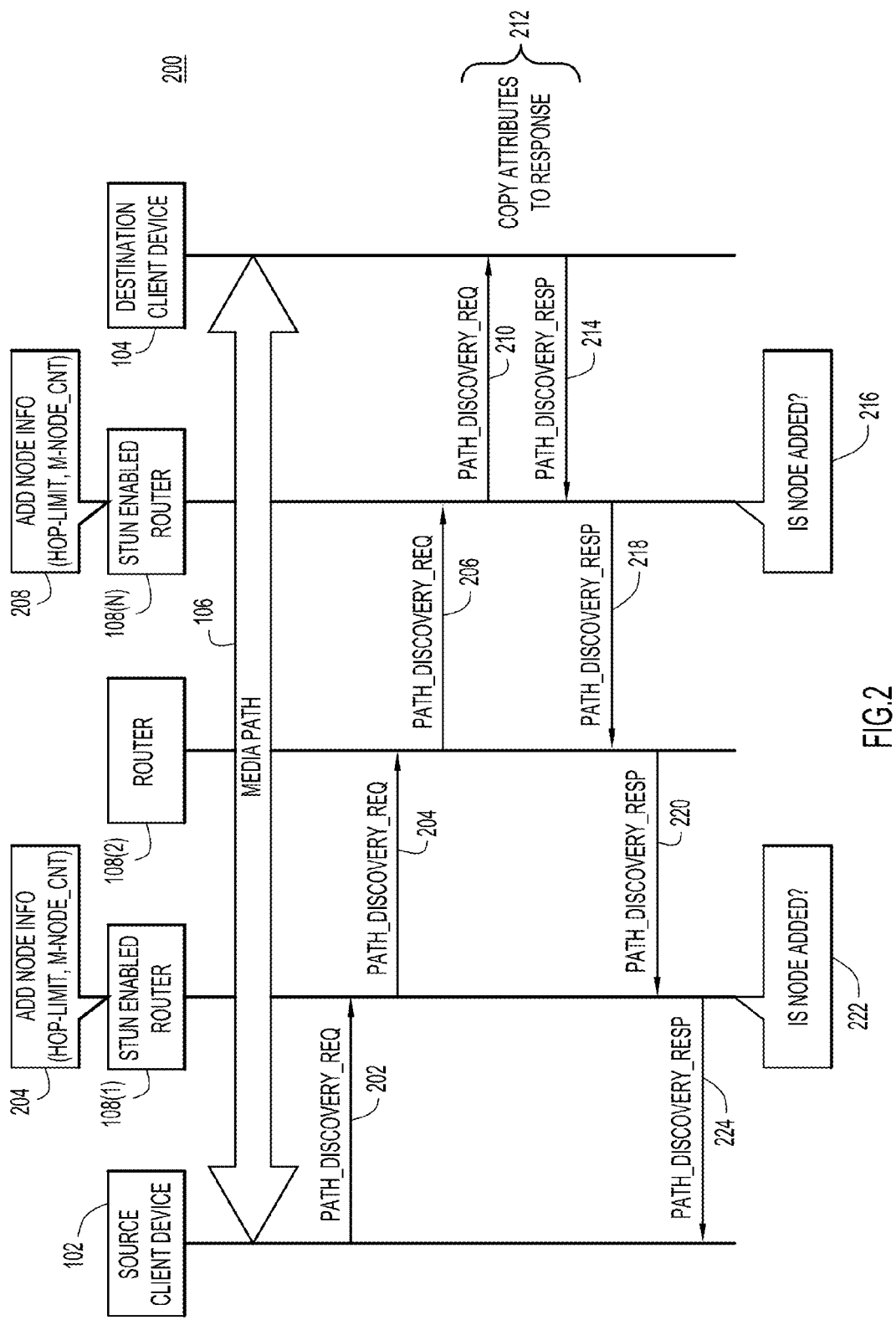
FIG. 2 shows an example ladder diagram depicting routers in the data path adding node hop attribute information to the STUN request message.

Reference is now made to FIG. 2. FIG. 2 shows an example ladder diagram 200 depicting a plurality of the routers 108(1)-108(n) in the data path 106 adding node hop attribute information to the STUN request message 110. The diagram 200 shows the data path 106 as a "media path" between the source client device 102 and the destination client device 104. The media path, as described above for the data path 106, is the same path that is used to exchange STUN messages for the end-to-end connectivity check, as well as to exchange data communication (rich media communications).

Thus, FIG. 2 shows in-path signaling connectivity messages exchanged between the source client device 102 and the destination client device 104. Diagram 200 shows a subset of the routers 108(1)-108(n) depicted in FIG. 1. In particular, diagram 200 shows routers 108(1) and 108(n) as STUN enabled routers, indicating that these routers are configured to modify the STUN request message 110 and the STUN response message 116 and to also read and evaluate these STUN messages. Additionally, the STUN enabled routers may be configured to modify the rich media that is subsequently exchanged in the media path based on the information obtained from the STUN messages, as described by the techniques hereinafter. Router 108(2) is depicted as a router that is not configured as a STUN enabled router, and thus router 108(2) can only forward the STUN messages along the media path and cannot read or modify these STUN messages.

At reference numeral 202, the source client device 102 sends the STUN request message 110 (shown as a Path Discovery Request ("Path_Discover_Req") message). In short, the path discovery messages shown in FIG. 2 enable every router in the media path to report independently about network or router conditions. Any router receiving a Path Discovery Request message can add itself as an explicit indication reporting point. At reference numeral 204, the router 108(1) modifies the Path Discovery Request message by adding node information associated with router 108(1). This node information may include a hop limit field ("Hop-Limit") that specifies a number of hops that a packet (e.g., a packet of the Path Discover Request or STUN request message) is allowed before it is discarded by a router (also known as a time to life or "TTL"). The node information may also include a node count field ("M-Node_Cnt") that specifies a number of nodes that a packet has traveled. Furthermore, the node information may also include a next hop field and a next hop forwarding field to indicate the next device to which a packet will be forwarded.

At 206, the modified Path Discovery Request is sent from router 108(1) to router 108(2). As stated above, router 108(2) is not a STUN enabled router, and thus, router 108(2) simply forwards the packet to router 108(n). At 208, router 108(n) modifies the Path Discovery Request message that it receives from router 108(2), and adds node information associated with router 108(n) (e.g., the hop limit, node count, next hop and next hop forwarding information described above). At operation 210, router 108(n) forwards the Path Discovery Request message to the destination client device 104. Thus, the destination client device 104 receives a message that has been modified twice: once by the router 108(1) and again by the router 108(n).

The destination client device 104 then copies the attributes in the Path Discovery Request message to generate a Path Discovery Response ("Path_Discovery_Resp") message, as shown at reference numeral 212. The Path Discovery Response message is, for example, the STUN response message 116. At 214, the Path Discovery Response message is sent to the router 108(n). Since the router 108(n) is a STUN enabled router, the router 108(n) evaluates the information in the Path Discovery Response message at 216 to obtain and evaluate the node information in the message.

The router 108(n) can also evaluate the Path Discovery Response message to obtain and evaluate information that it previously added to the Path Discovery Request message and to obtain and evaluate other information added by other STUN enabled routers (e.g., router 108(1)). For example, as described hereinafter, the router 108(n) can then use this information to modify rich media that is subsequently exchanged along the media path. Thus, since the router 108(n) is able to modify rich media exchanged along the same media path that was used for the connectivity messages, the router 108(n) is able to perform "in-band" or "in-path" data modifications to the subsequent rich media. In other words, the subsequent rich media that is sent along the media path is sent from a same IP address and port as the STUN request and STUN response message, and thus, every STUN enabled router in the media path can identify itself to the source client device 102 that issues the request. Adding opaque identifiers (e.g., in the payload of the STUN messages) allows the STUN enabled routers to provide independent reports regarding network attribute information.

At 218, the router 108(n) sends the Path Discover Response message to the router 108(2). Again, since router 108(2) is not a STUN enabled router, it simply forwards the message the router 108(1) at 220. At 222, the router 108(2) evaluates the information in the Path Discovery Response message to obtain and evaluate the node information in the message. Similar to the router 108(n), since router 108(1) is a STUN enabled router, router 108(1) can evaluate the Path Discovery Response message to obtain and evaluate information (e.g., static information) that it previously added to the Path Discovery Request message and to obtain and evaluate information added by other STUN enabled routers (e.g., routers 108(n)). Router 108(1) can then use this information to later modify rich media (e.g., perform in-band modifications to rich media in the media path 106) that is subsequently exchanged along the media path. At 224, the router 108(1) sends the Path Discovery Response message to the source client device 102. Upon receiving the Path Discovery Response message, the source client device 102 can evaluate the message to determine the network characteristics (e.g., bandwidth capabilities, processing capabilities, congestion information, etc.) of the media path 106 and can utilize this information to modify subsequent rich media to ensure a desirable transmission of this data. For example, characteristics such as the number of STUN enabled routers in a data path and the number of non-STUN enabled routers in a data path may be obtained from information in the STUN request and STUN response messages (e.g., from information already in an Internet Protocol header of these messages). Additionally, information can be obtained from the STUN request and STUN response messages that relate to detecting whether data path for the STUN request message diverges or is different from the data path for the STUN response message. Furthermore, information pertaining to round trip time (RTT) can be obtained.

Figure 3:
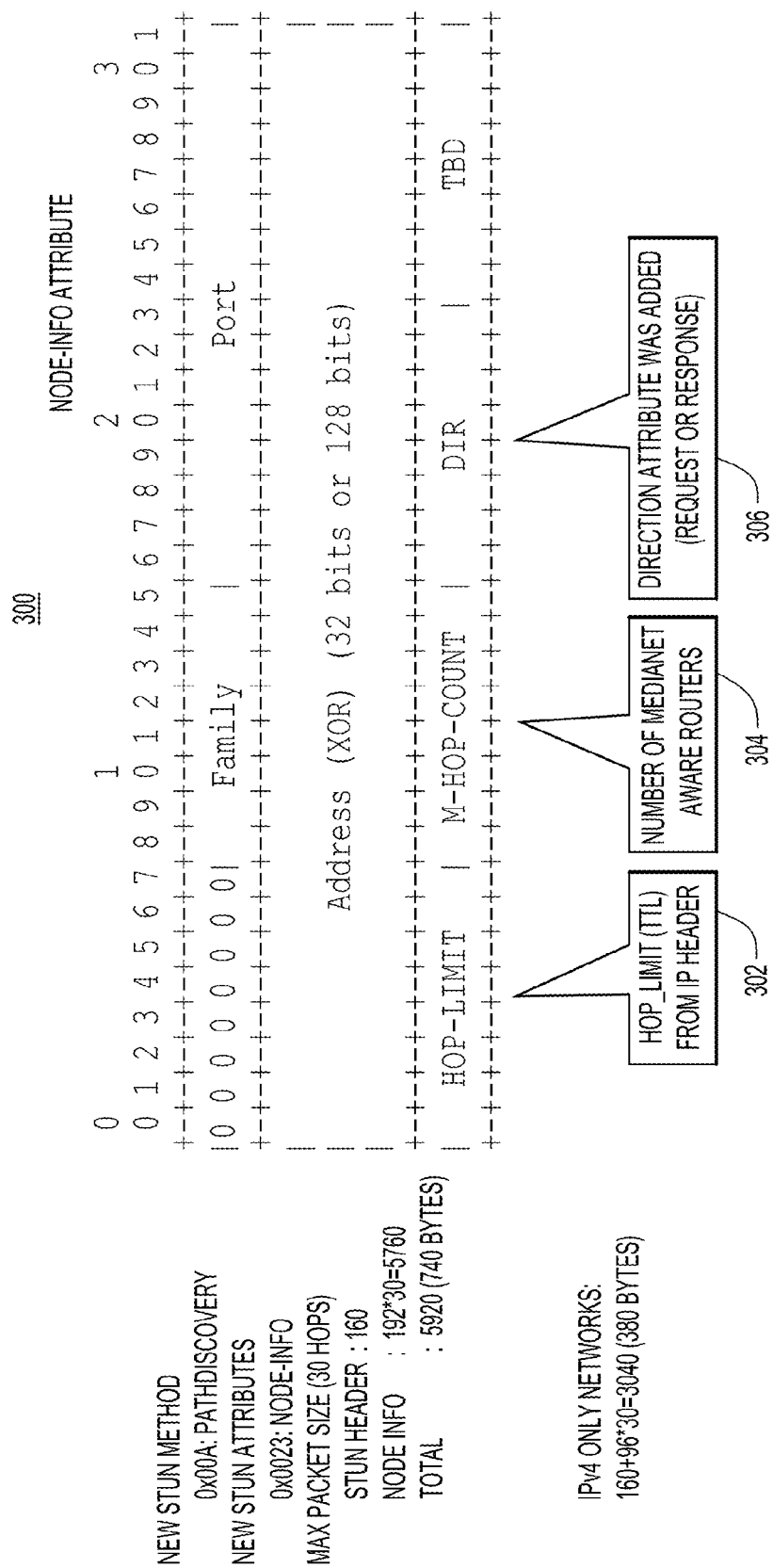
FIG. 3 shows an example of the modified STUN request message with the node hop attribute information.

Reference is now made to FIG. 3. FIG. 3 shows, at reference numeral 300, an example of the modifications made to the Path Discovery Request message (i.e., the STUN request message 110) by one or more STUN enabled routers. In particular, FIG. 3 shows modifications to the message with node hop attribute information. It should be appreciated that the message format depicted in FIG. 3 is simply an example, and other message formats may be possible to accomplish the techniques described herein. As shown, information 302, 304 and 306 (e.g., hop limit, hop count and direction information) may be embedded in a payload of the Path Discovery Request message. Alternatively, this information may also be embedded in a header or elsewhere in the message. It should be appreciated that the STUN enabled routers may add new attributes to existing STUN messages. When the information is embedded in a payload of the message, only STUN enabled routers (e.g., routers 108(1) and 108(n) in FIG. 1) may be configured to obtain and evaluate this information. On the other hand, when this information is embedded in the header of the STUN message(s), all routers (STUN enabled or not) may be able to obtain and evaluate this information.

Reference is now made to FIG. 4. FIG. 4 shows, at reference numeral 400, another example of modifications made to the Path Discovery Request message by one or more of the STUN enabled routers. In particular, FIG. 4 shows information 402 (e.g., processing load ("CPU load"), memory information ("queue fill grade"), maximum transmission unit ("MTU") information, etc.) that maybe be added to the message. As described above, this information may be added to a payload of the message or may be added to a header of the message.

Figure 5:
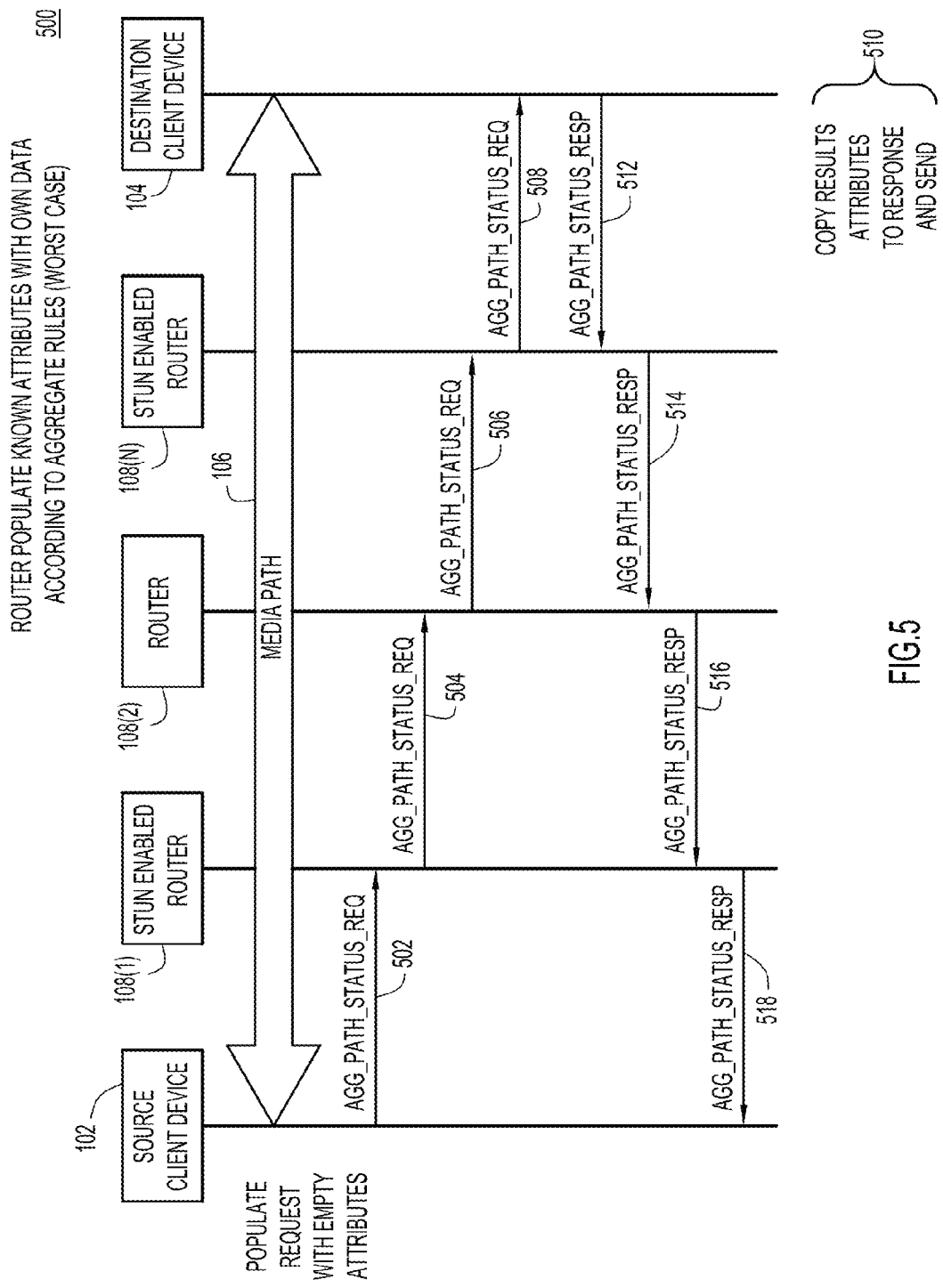
FIG. 5 shows an example ladder diagram depicting routers in the data path adding aggregated attribute information to the STUN request message.

Reference is now made to FIG. 5. FIG. 5 shows an example ladder diagram 500 depicting the routers adding aggregate attribute information the STUN request message 110. The STUN request message 110 in FIG. 5 is shown as an Aggregate Path Status Request ("Agg_Path_Status_Req") message. In general, the flow of the Aggregate Path Status Request message in the media path 106 is similar to that depicted for the Path Discovery Request message described in FIG. 2 above. That is, the Aggregate Path Status Request message is sent by the source client device 102 and is received by the destination client device 104, as shown at reference numeral 502, 504, 506 and 508, via the routers 108(1), 108(2) and 108(n). Routers 108(1) and 108(n) are STUN enabled routers, and thus, these routers are able to modify the message to add aggregated attribute information (e.g., trace identifier information) to the message. The destination client device 104 copies the Aggregate Path Status Request message, as shown at 510, and sends a Path Status Response Aggregate ("Path_Status_RespAgg_") message back to the source client device 102. The Path Status Response Aggregate message represents the STUN response message 116, described above. The STUN enabled routers are able to evaluate the message to determine the information that other STUN enabled routers added. This information can be used by these router devices to later perform in-band modifications on subsequent rich media exchanged in the media path. The source client device 102 receives the Path Status Response Aggregate message, and it too can perform modifications on subsequent rich media based on this information. In one example, the aggregate message may be used to ensure that the message size remains relatively small. For example, a router may only modify a specific attribute in the STUN messages if its own data is better/worse than what a previous router added or overwrote in that attribute. In another example, the STUN messages can simply provide network characteristic information associated with each of the routers (without reference to other routers) and the source client device can evaluate the information to determine how to modify subsequent communications based on this aggregate information of all the routers in the data path(s). For example, such information may provide information pertaining to how many packets a particular router has dropped. That is, the Path Discovery provides static information, and the path status messages provide snapshots/histories of the running status of each router element.

Figure 6:
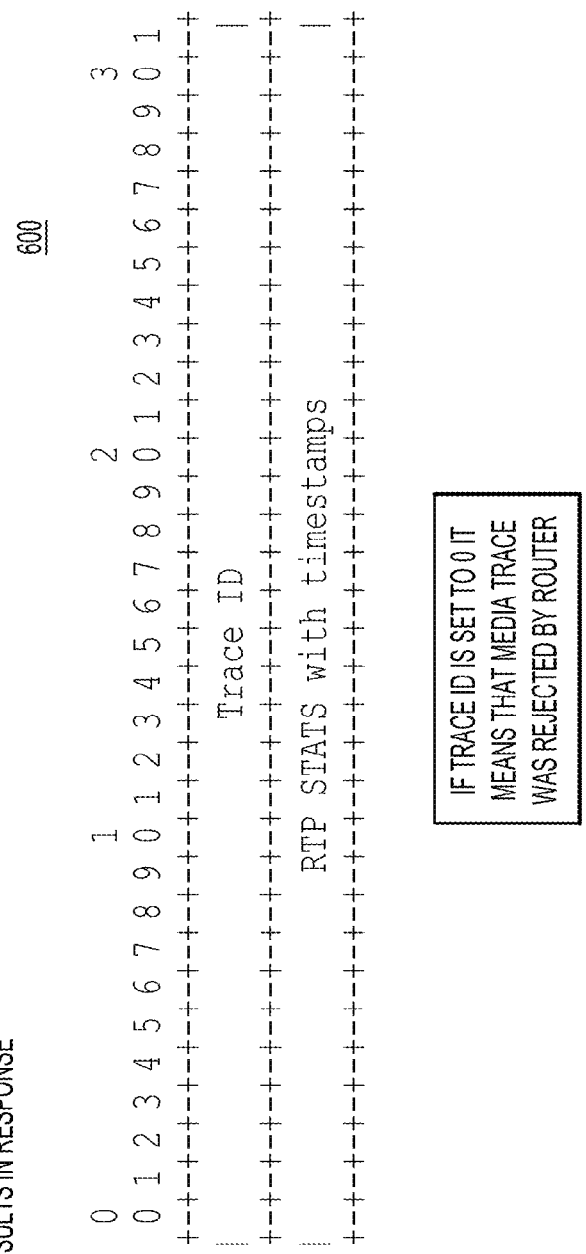
FIG. 6 shows an example of the modified STUN request message with trace identifier information added by the routers in the data path.

Reference is now made to FIG. 6. FIG. 6 shows, at reference numeral 600, an example of the modifications made to the Aggregate Path Status Request message (i.e., the STUN request message 110) by one or more STUN enabled routers. In particular, FIG. 6 shows modifications to the message with trace identifier information 602 that may be embedded in a payload of the Aggregate Path Status Request message. It should be appreciated that the message format depicted in FIG. 6 is simply an example, and other message formats may be possible to accomplish the techniques described herein. Alternatively, this information may also be embedded in a header of the message. When the information is embedded in a payload of the message, only STUN enabled routers (e.g., routers 108(1) and 108(n) in FIG. 1) may be configured to obtain and evaluate this information. On the other hand, when this information is embedded in the header of the message, all routers (STUN enabled or not) may be able to obtain and evaluate this information.

Thus, as stated above, the STUN enabled routers are configured to modify STUN messages to add or input corresponding network characteristic information (e.g., node and aggregated attribute information). This information may indicate attributes of the network 100 at the particular routers (e.g., bandwidth characteristics, processing load characteristics, network congestion information, etc.). As the STUN request messages and the STUN response messages travel through the data path 106, the devices (e.g., STUN enabled routers, source client device 102 and destination client device 104) that ultimately receive and evaluate the information to determine whether or not to modify rich media that is subsequently sent along the data path 106. That is, these devices that ultimately receive the information may, for example, reduce a bit rate and/or degrade the quality of the rich media preemptively before the rich media reaches a point of congestion in the network 100. For example, if the new information added to the STUN request messages indicates that Router N has reduced processing capabilities, the source client device 102 may reduce the bit rate of the rich media that subsequently travels across the data path 106 to ensure that the rich media data still arrives at the destination client device 104, to compensate for the now known reduced processing capabilities of Router N Likewise, a STUN enabled router that receives the rich media before Router N may itself reduce the bit rate and/or degrade the quality of the rich media before the media is forwarded to Router N. Thus, since the information in the STUN request and STUN response messages contain network attribute information associated with the routers in the data path 106, the source client device 102 can modify the rich media before transmission on the data path 106 to ensure that the rich media reaches the destination client device 104 with little or no disruptions. Likewise, routers in the network 100 can perform in-band modifications to the rich media to ensure that rich media communications are sent from the source client device 102 to the destination client device 104 with little to no disruptions.

In one example, if the information in the STUN request and STUN response messages indicate that relatively small packet losses may occur at one of the routers for imminent communications, the source client device 102 may add, for example 30% redundant information (e.g., redundant frames) when transmitting the rich media. If the congestion does indeed occur at the router, the router can discard unimportant packets in the rich media, leading to minimal impact of the media quality at the destination client device 104. One technique that may be used to reduce congestion based loss is for the source client device 102 to use markings to tag rich media packets at various levels of importance.

Figure 7:
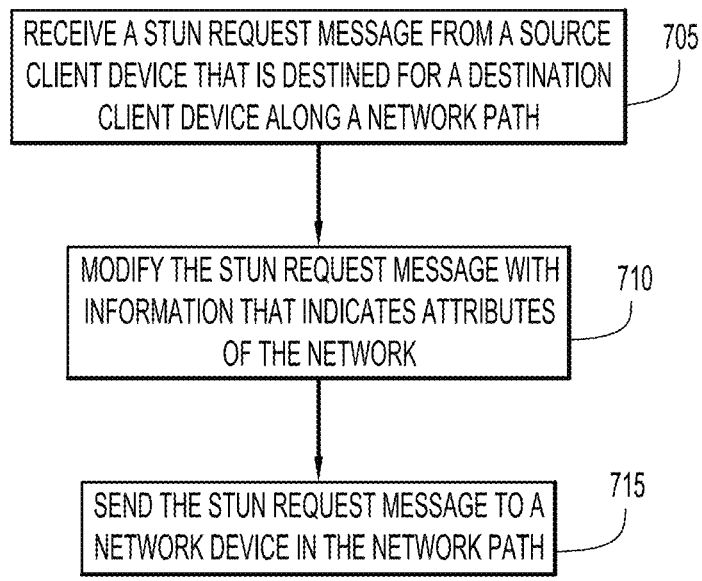
FIG. 7 shows an example flow chart depicting operations performed by one or more of the routers to modify the STUN request messages.

Reference is now made to FIG. 7. FIG. 7 shows an example flow chart 700 depicting operations performed by one or more of the routers 108(1)-108(n) to modify the STUN request messages. At operation 705, a router device (e.g., a STUN enabled router) receives a STUN request message from a source client device that is destined for a destination client device along a network path. At operation 710, the STUN request message is modified with information that indicates attributes of the network, and at operation 715, the STUN request message is forwarded to a network device in the network path.

Figure 8:
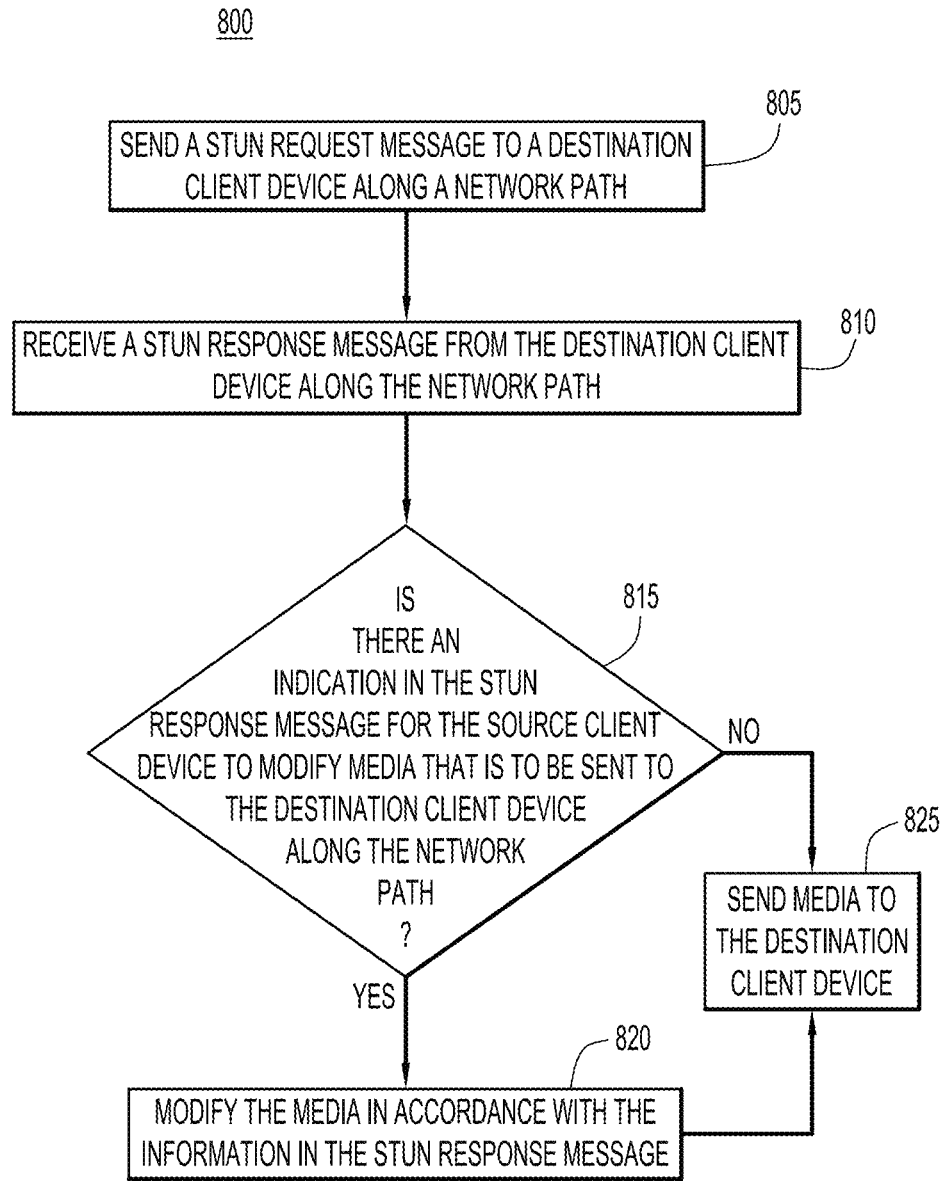
FIG. 8 shows an example flow chart depicting operations performed by the source client device to modify media in accordance with information in a STUN response message.

Reference is now made to FIG. 8. FIG. 8 shows an example flow chart 800 depicting operations performed by the source client device 102 to modify media in accordance with information in a STUN response message. At operation 805, a STUN request message is sent from a source client device to a destination client device along a network path. At operation 810, a STUN response message is received by the source client device from the destination client device along the network path. At operation 815, a determination is made as to whether the STUN response message has an indication for the source client device to modify media that is to be sent to the destination client device along the network path. If so, operation 820 indicates that the source client device modifies the media in accordance with the information in the STUN response message. Then, at operation 825, the source client device sends media (with the modifications) to the destination client device. If it is determined that the STUN response message does not have an indication for the source client device to modify the media (i.e., if the answer to operation 815 is "no"), the source client device performs operation 825 and sends media (without modifications) to the destination client device.

Figure 9:
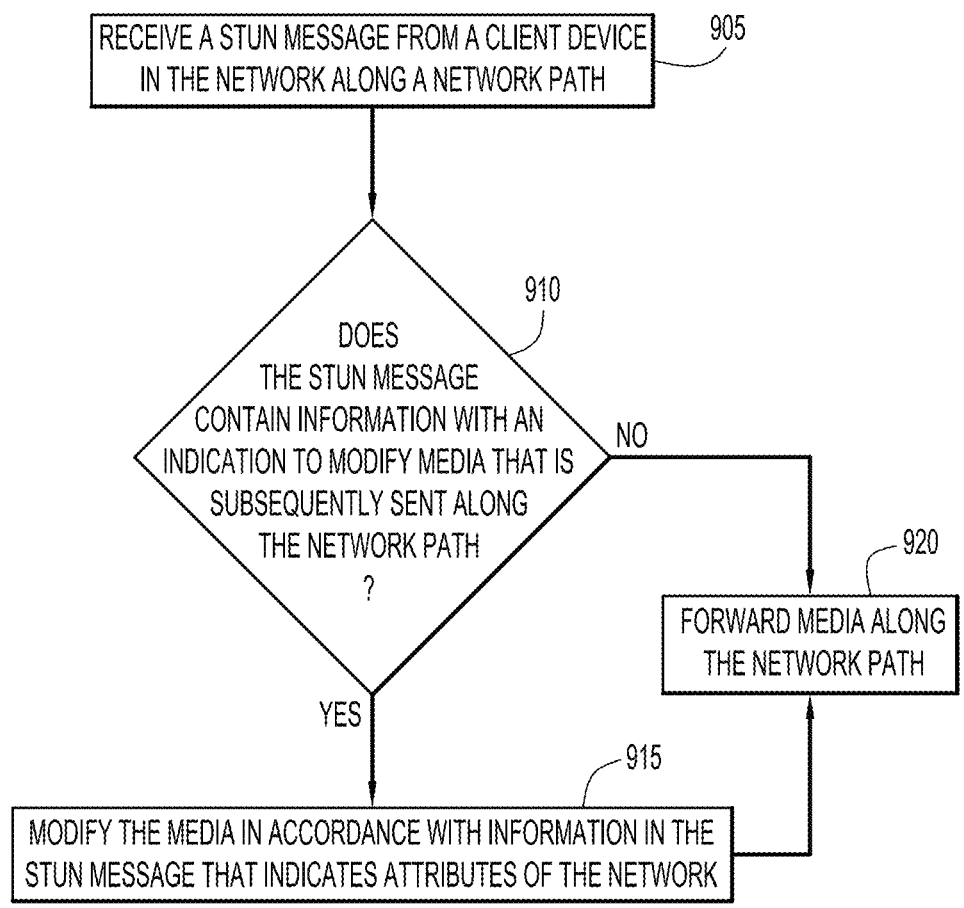
FIG. 9 shows an example flow chart depiction operations performed by one or more of the routers to modify media in accordance with information in a STUN message.

Reference is now made to FIG. 9. FIG. 9 shows an example flow chart 900 depicting operations performed by one or more of the routers 108(1)-108(n) to modify media in accordance with information in a STUN message. At operation 905, a router (e.g., a STUN enabled router) receives a STUN message (STUN request message and/or STUN response message) from a client device (source client device or destination client device) in the network along a network path. For example, in this operation the STUN enabled router may "detect" a STUN message that is intended for a destination client device, wherein the destination address of the STUN message is the address of the destination client device. At operation 910, a determination is made as to whether the STUN message contains information with an indication to modify media that is subsequently sent along the network path. If so, at operation 915, the router modifies the media upon receiving it in accordance with information in the STUN message that indicates attributes of the network. The router then forwards media along the network path at operation 920. If the STUN message does not contain information with an indication to modify media (i.e., if the answer to operation 910 is "no"), the router performs operation 920 to forward media along the network path without modifying it.

Figure 10:
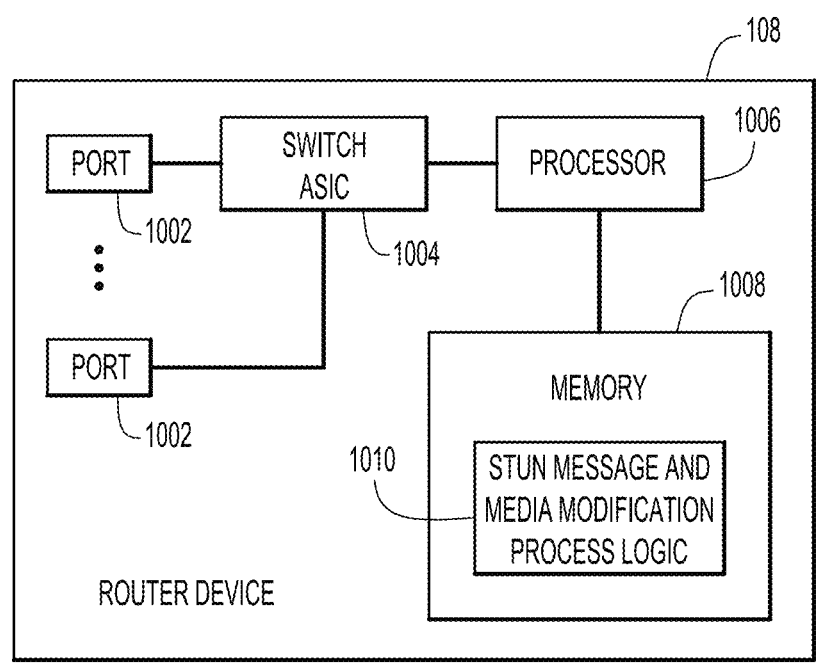
FIG. 10 shows an example block diagram of a router device configured to modify the STUN request message and the media.

Reference is now made to FIG. 10. FIG. 10 shows an example block diagram 108 of a router device. It should be appreciated that the router device 108 in FIG. 10 may represent any STUN enabled router device in the network 100. The router device comprises, among other components, a plurality of ports 1002, a switch Applicant Specific Integrated Circuit (ASIC) 1004, a processor 1006 and a memory unit 1008. The ports 1002 are configured to send and receive STUN messages and rich media, and the switch ASIC 1004 is configured to route STUN messages and rich media to appropriate devices in the network via appropriate corresponding ports 1002. The processor 1006 is, for example, a microprocessor or microcontroller that is configured to execute program logic instructions (i.e., software) for carrying out various operations and tasks of the router device 108, as described above. For example, the processor 1006 is configured to execute STUN message and media modification process logic 1010 to modify the STUN messages and the rich media, according to the techniques described above. The functions of the processor 1006 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 1008 may comprise read only memory (ROM), random access memory (RAM), magnetic disk storage media devices, optical storage media devices, flash memory devices, electrical, optical, or other physical/tangible (non-transitory) memory storage devices. The memory 1008 stores software instructions for the STUN message and media modification process logic 1010. Thus, in general, the memory 1008 may comprise one or more computer readable storage media (e.g., a memory storage device) encoded with software comprising computer executable instructions and when the software is executed (e.g., by the processor 1006) it is operable to perform the operations described for the STUN message and media modification process logic 1010.

The STUN message and media modification process logic 1010 may take any of a variety of forms, so as to be encoded in one or more tangible computer readable memory media or storage device for execution, such as fixed logic or programmable logic (e.g., software/computer instructions executed by a processor), and the processor 1006 may be an ASIC that comprises fixed digital logic, or a combination thereof.

For example, the processor 1006 may be embodied by digital logic gates in a fixed or programmable digital logic integrated circuit, which digital logic gates are configured to perform the STUN message and media modification process logic 1010. In general, the STUN message and media modification process logic 1010 may be embodied in one or more computer readable storage media encoded with software comprising computer executable instructions and when the software is executed operable to perform the operations described hereinafter.

Figure 11:
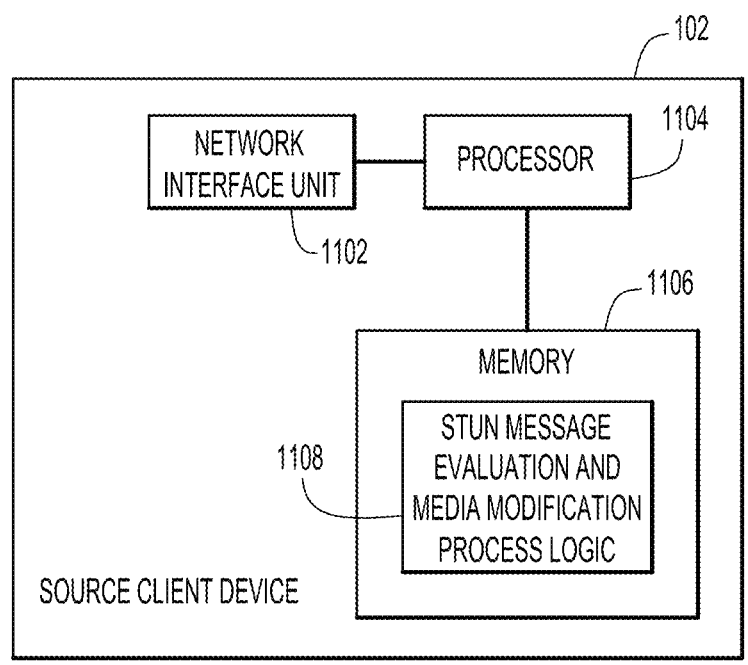
FIG. 11 shows an example block diagram of the source client device configured to modify the media in accordance with information in the STUN response message.

Reference is now made to FIG. 11. FIG. 11 shows an example block diagram of the source client device 102. The source client device 102 comprises, among other components, a network interface unit 1102, a processor 1104 and a memory 1106. The network interface unit is configured to send and receive STUN messages and rich media. The processor 1104 is, for example, a microprocessor or microcontroller that is similar to that described in connection with FIG. 10 above, and configured to execute program logic instructions (i.e., software) for carrying out various operations and tasks of the source client device 102, as described above. For example, the processor 1104 is configured to execute STUN message evaluation and media modification process logic 1108 stored in memory 1106 to evaluate received STUN messages and to modify rich media in response to information obtained from the evaluation, according to the techniques described above.

The memory 1106 may be similar in form to memory 1008 described above, and may comprise read only memory ROM, RAM, magnetic disk storage media devices, optical storage media devices, flash memory devices, electrical, optical, or other physical/tangible (non-transitory) memory storage devices. The memory 1106 stores software instructions for the STUN message evaluation and media modification process logic 1108. The STUN message evaluation and media modification process logic 1108 may take any of a variety of forms so as to be encoded in one or more tangible computer readable memory media or storage device for execution, such as fixed logic or programmable logic (e.g., software/computer instructions executed by a processor).

It should be appreciated that the techniques described above in connection with all embodiments may be performed by one or more computer readable storage media that is encoded with software comprising computer executable instructions to perform the methods and steps described herein. For example, the operations performed by the source client device 102, the routers 108(1)-108(n) and the destination client device 104 may be performed by one or more computer or machine readable storage media (non-transitory) or device executed by a processor and comprising software, hardware or a combination of software and hardware to perform the techniques described herein.

Furthermore, a method is provided comprising: at a router device in a network, receiving a Session Traversal Utilities for Network Address Translators (STUN) message from a client device in the network along a network path; evaluating the STUN message for information that indicates to the router device to modify media that is subsequently sent along the network path; and if the evaluating indicates that the router device is to modify the media, modifying the media in accordance with information in the STUN message that indicates attributes of the network.

In addition, an apparatus is provided comprising: a plurality of ports; a memory unit; and a processor coupled to the ports and the memory unit and configured to: receive a Session Traversal Utilities for Network Address Translators (STUN) message from a client device in the network along a network path; evaluate the STUN message for information that instructs the processor to modify media that is subsequently sent along the network path; and modify the media in accordance with information in the STUN message that indicates attributes of the network.

Additionally, one or more computer readable storage media is provided that is encoded with software comprising computer executable instructions and when the software is executed operable to: receive a Session Traversal Utilities for Network Address Translators (STUN) message from a client device in the network along a network path; evaluate the STUN message for information that instructs the processor to modify media that is subsequently sent along the network path; and modify the media in accordance with information in the STUN message that indicates attributes of the network.

The above description is intended by way of example only. Various modifications and structural changes may be made therein without departing from the scope of the concepts described herein and within the scope and range of equivalents of the claims.

What is claimed is:

1. A method comprising:
   at a Session Traversal Utilities for Network Address Translators (STUN) enabled router device among multiple router devices in a network:
   receiving a STUN request from a source client device, the STUN request destined for a destination client device along a network path that traverses the multiple router devices;
   adding to a payload of the STUN request first node information including a node hop-limit that specifies a number of hops that a packet is allowed before being discarded by a router, a hop-count that specifies a number of nodes that a packet has traversed, a direction attribute that specifies whether a packet is a request or a response, and an attribute of one of bandwidth, processing load, or congestion at the router device;
   forwarding the modified STUN request toward the destination client device along the network path;
   receiving from the destination client device a STUN response that includes (i) the first node information that was copied from the STUN request into the STUN response at the destination client device, and (ii) further node information including a node hop-limit, a hop-count, a direction attribute, and an attribute of bandwidth, processing load, or congestion of a first other router device of the multiple router devices, wherein the further node information was added to the STUN request or the STUN response by the first other router device as the STUN request and STUN response traversed the multiple routers along the network path;
   evaluating the further node information in the STUN response, including the one of bandwidth, processing load, or congestion added by the first other router device; and
   if the evaluating indicates that the first other router device has less bandwidth or a reduced processing capability relative to the router device, reducing a bit rate or a quality of rich media received from the source client device before forwarding the rich media to the first other router device toward the destination client device.

2. The method of claim 1, wherein the reducing includes reducing the bit rate to reduce a processing load of the first other router device.

3. The method of claim 1, wherein the reducing the bit rate includes reducing the bit rate in response to an indication in the STUN request that instructs the router device to adjust real time data in accordance with network conditions.

4. The method of claim 1, further comprising sending modified media after the reducing to the destination client device.

5. An apparatus comprising:
   a plurality of ports to receive data packets and forward the data packets to appropriate destinations in a network;
   a memory unit; and
   a processor coupled to the ports and the memory unit and configured to:
   receive a Session Traversal Utilities for Network Address Translators (STUN) request from a source client device, the STUN request destined for a destination client device along a network path that traverses multiple router devices;
   add to a payload of the STUN request first node information including a node hop-limit that specifies a number of hops that a packet is allowed before being discarded by a router, a hop-count that specifies a number of nodes that a packet has traversed, a direction attribute that specifies whether a packet is a request or a response, and an indication of one of bandwidth, processing load, or congestion at the apparatus;
   forward the modified STUN request toward the destination client device along the network data path;
   receive from the destination client device a STUN response that includes (i) the first node information that was copied from the STUN request into the STUN response at the destination client device, and (ii) further node information including a node hop-limit, a hop-count, a direction attribute, and an attribute of bandwidth, processing load, or congestion at a first other router device of the multiple router devices, wherein the further node information was added to the STUN request or the STUN response by the first other router device as the STUN request and STUN response traversed the multiple routers along the network path;
   evaluate the further node information in the STUN response, including the one of bandwidth, processing load, or congestion added by the first other router device; and
   if evaluation of the further node information indicates that the first other router device has less bandwidth or a reduced processing capability relative to the apparatus, reduce a bit rate or a quality of rich media received from the source client device before forwarding the rich media to the first other router device toward the destination client device.

6. The apparatus of claim 5, wherein the processor is further configured to reduce the bit rate to reduce a processing load of the first other router device in the network path based on information in the STUN response.

7. The apparatus of claim 5, wherein the processor is further configured to reduce the bit rate in response to an indication in the STUN request that instructs the apparatus to adjust real time data in accordance with network conditions.

8. The apparatus of claim 7, wherein the processor is further configured to send modified media after the reducing to the destination client device.

9. One or more non-transitory computer readable storage media encoded with software comprising computer executable instructions and when the software is executed, by a processor of a Session Traversal Utilities for Network Address Translators (STUN) enabled router device to receive data packets and forward the data packets to appropriate destinations in a network, operable to:

receive a STUN request from a source client device, the STUN request destined for a destination client device along a network path that traverses multiple router devices;

add to a payload of the STUN request first node information including a node hop-limit that specifies a number of hops that a packet is allowed before being discarded by a router, a hop-count that specifies a number of nodes that a packet has traversed, a direction attribute that specifies whether a packet is a request or a response, and an indication of one of bandwidth, processing load, or congestion at the apparatus;

forward the modified STUN request toward the destination client device along the network data path;

receive from the destination client device a STUN response that includes (i) the first node information that was copied from the STUN request into the STUN response at the destination client device, and (ii) further node information including a node hop-limit, a hop-count, a direction attribute, and an attribute of bandwidth, processing load, or congestion at a first other router device of the multiple router devices, wherein the further node information was added to the STUN request or the STUN response by the first other router device as the STUN request and STUN response traversed the multiple routers along the network path;

evaluate the further node information in the STUN response, including the one of bandwidth, processing load, or congestion added by the first other router device; and if evaluation of the further node information indicates that the first other router device has less bandwidth or a reduced processing capability relative to the apparatus, reduce a bit rate or a quality of rich media received from the source client device before forwarding the rich media to the first other router device toward the destination client device.

10. The one or more computer readable storage media of claim 9, wherein the instructions operable to reduce comprise instructions operable to reduce the bit rate to reduce a processing load of the first other router device in the network path based on information in the STUN response.

11. The one or more computer readable storage media of claim 9, wherein the instructions operable to reduce comprise instructions operable to reduce the bit rate in response to an indication in the STUN request that instructs the router device to adjust real time data in accordance with network conditions.

12. The method of claim 1, further comprising forwarding the STUN response, including the first node information added thereto by the router device and the further node information added thereto by the first other router device, to the client device so that the client device is able to modify media sent to the destination client device along the network path in accordance with the first node information and the further node information.

13. The apparatus of claim 5, wherein the processor is further configured to forward the STUN response, including the first node information added thereto by the router device and the further node information added thereto by the first other router device, to the client device so that the client device is able to modify media sent to the destination client device along the network path in accordance with the first node information and the further node information.

14. The one or more computer readable storage media of claim 9, further comprising instructions to cause the processor to forward the STUN response, including the first node information added thereto by the router device and the further node information added thereto by the first other router device, to the client device so that the client device is able to modify media sent to the destination client device along the network path in accordance with the first node information and the further node information.

* * * * *

UNITED STATES PATENT AND TRADEMARK OFFICE
CERTIFICATE OF CORRECTION

PATENT NO. : 9,253,237 B2  
APPLICATION NO. : 13/736161  
DATED : February 2, 2016  
INVENTOR(S) : Wing et al.

Page 1 of 1

It is certified that error appears in the above-identified patent and that said Letters Patent is hereby corrected as shown below:

In the Claims

In Col. 16, lines 3-4, replace "apparatus, reduce" with --router device, reducing--.

Signed and Sealed this  
Thirty-first Day of May, 2016

Michelle K. Lee  
*Director of the United States Patent and Trademark Office*